United States Patent [19]

Paton et al.

[11] Patent Number: 4,779,850

[45] Date of Patent: Oct. 25, 1988

[54] COMPOSITE SPRING WITH SUCTION SEAL

[75] Inventors: H. Neil Paton; Frank F. Smith, both of Seattle, Wash.

[73] Assignee: The Paton Corporation, Seattle, Wash.

[21] Appl. No.: 14,472

[22] Filed: Feb. 13, 1987

[51] Int. Cl.$^4$ .............. B60G 11/52; B60G 11/62; F16F 3/08; F16J 9/08

[52] U.S. Cl. .................... 267/33; 267/35; 267/152; 267/292; 277/164; 277/205; 277/212 R

[58] Field of Search .............. 267/33, 170, 179, 248, 267/249, 221, 257, 286, 201, 202, 152, 153, 220, 258, 287, 292, 35; 280/668, 670; 277/152, 205, 164, 212 R

[56] References Cited

U.S. PATENT DOCUMENTS

| | | | |
|---|---|---|---|
| 1,869,793 | 8/1932 | Bailey | 267/35 X |
| 1,936,389 | 11/1933 | Halquist | 267/33 |
| 2,005,089 | 6/1935 | Krebs | 267/33 |
| 2,156,580 | 5/1939 | Best | 267/286 X |
| 2,230,069 | 1/1941 | Rushmore | 267/38 |
| 2,514,394 | 7/1950 | Irving | 267/170 X |
| 2,605,099 | 7/1952 | Brown | 267/33 |
| 2,822,165 | 2/1958 | Boschi | 267/33 |
| 3,037,764 | 6/1962 | Paulsen | 267/292 |
| 3,051,469 | 8/1962 | Boschi | 267/33 |
| 3,057,640 | 10/1962 | Soer | 267/286 X |
| 3,118,659 | 1/1964 | Paulsen | 267/33 |
| 3,279,779 | 10/1966 | Thomas et al. | 267/292 |
| 3,330,567 | 7/1967 | Mercer et al. | 277/164 |
| 3,447,814 | 6/1969 | Siber et al. | 280/124 |
| 4,475,725 | 10/1984 | Niemann | 267/286 |
| 4,562,997 | 1/1986 | Iwata et al. | 267/221 |
| 4,613,317 | 9/1986 | Morihiro | 277/205 |

FOREIGN PATENT DOCUMENTS

| | | |
|---|---|---|
| 160851 | 4/1954 | Australia . |
| 662622 | 7/1938 | Fed. Rep. of Germany . |
| 1440023 | 8/1966 | France . |
| 52-24676 | 2/1977 | Japan . |
| 58-118344 | 7/1983 | Japan .................... 267/152 |
| 0245843 | 12/1985 | Japan .................... 267/33 |
| 755186 | 8/1956 | United Kingdom . |
| 1437525 | 5/1976 | United Kingdom ........ 267/152 |

OTHER PUBLICATIONS

Rowland, "Suspension Simplicity from Paton," Automotive News, Jul. 28, 1986, at 32.

The Paton Corp., "The Electronic Suspension Revolution and the Paton Dry-Namic TM (Non-Hydraulic) Suspensions," Jun. 1986.

Gieck et al., "The 'Marsh Mellow' Spring," SAE Technical Paper 820,161, Feb. 22, 1982.

Moulton et al., "Rubber Springs for Vehicle Suspension," published by the Institute of Mechanical Engineering, 1956.

Primary Examiner—Andres Kashnikow
Assistant Examiner—Robert J. Oberleitner
Attorney, Agent, or Firm—Finnegan, Henderson, Farabow, Garrett & Dunner

[57] ABSTRACT

The spring includes a tubular elastomeric body and an embedded coil spring composed entirely of active coils. The ends of the body are contoured with respect to the ends of the coil spring, and provide for control of the orientation of the composite spring with respect to spring seats. An end seal for composite or other tubular elastomeric springs also is disclosed.

12 Claims, 1 Drawing Sheet

COMPOSITE SPRING WITH SUCTION SEAL

BACKGROUND OF THE INVENTION

This invention relates to springs and, more particularly, to composite springs made up of a tubular elastomeric body having a coil spring embedded in it.

Most composite springs include coil springs which have flat wound end turns. That is to say, each of the two outermost turns of the spring is of progressively decreasing pitch and is of sufficient length that it closes upon itself. This forms a square profiled end which tends to stabilize the spring when it is supported by conventional flat spring seats. These outermost turns, however, are essentially inactive from the standpoint of providing resilient spring effects in cooperation with the intervening portions of the elastomeric body. Consequently, it may be necessary, in some practical applications, to increase the overall length of the composite spring in order to achieve sufficient numbers of active coils. This means that the composite spring, in order to achieve satisfactory performance, may be of unsatisfactory length, or may be uneconomical to manufacture on account of the added costs associated with encasing and forming the inactive turns, or both.

Another drawback of composite springs of the type just described is that, in some applications involving restricted or confined space requirements, such as those commonly found in connection with automotive suspensions, the spring needs to be positioned and maintained at a predetermined rotative orientation with respect to its spring seats. This is commonly referred to as "clocking" the spring. This requirement is especially important in those applications where the spring is mounted between the spring seats of a wishbone or trailing arm suspension, in which the spring seats are moved with respect to one another on a pivotal linkage that causes them to compress the composite spring in non-axial directions. In these and other generally similar applications, the composite spring typically is fabricated so that its compression characteristics, when positioned at a predetermined rotative or "clock" position, counteract the nonsymmetrical bulging effects which occur as a result of the spring seat construction. Consequently, so long as the composite spring is maintained in this position, it can be compressed in a stable manner, without fears of buckling. If the spring shifts away from the predetermined "clock" position, however, the tendency for it to buckle on account of nonsymmetric loading is increased.

Still another requirement of composite springs of the type just described, as well as other tubular elastomeric springs, especially when used as the primary spring elements of automotive suspension struts, is that they cooperate with the spring seats to effectively seal the moving parts of the suspension strut against the entrance of moisture, dirt or other contaminants. The most commonly used end constructions for such springs, however, does not afford satisfactory seals for this purpose because they are formed merely to rest upon the spring seats between which the springs are mounted, and typically have square or blunted end profiles.

SUMMARY OF THE INVENTION

An object of this invention is to provide a composite spring having an embedded coil spring which has no inactive or "dead" coils.

Another object of this invention is to provide a composite spring which is readily adaptable for positioning in a single, predetermined orientation.

Still another object of this invention related to that just stated is to provide a composite spring having one or both ends of a predetermined profile, each of which is so engageable with a conforming spring seat that the spring can be mounted by the seat in a single position which corresponds to a predetermined rotative or "clock" position, or a predetermined end-for-end position, or both.

Another object of this invention is to provide for sealing of one or both ends of a composite or other tubular elastomeric spring.

To achieve these objects and in accordance with the principles of this invention, this invention provides a composite spring having an embedded coil spring composed entirely of active coils. The coil spring includes two end coils, one of which is made up of a partial turn having a uniform pitch with respect to an adjacent coil, and a terminus spaced from this adjacent coil. The elastomeric body forms a shoulder adjacent the terminus of this partial turn. According to further principles of this invention, the other end coil of the coil spring and the other end of the elastomeric body may be of corresponding construction. Thus, it is possible, by providing spring seats, each with a single, appropriately located, recess engagable with one of these shoulders, to control the rotative orientation of the spring when seated, and hence ensure that it is positioned at a single, predetermined rotative or "clock" position. In addition, it is possible, by offsetting the shoulders, to control the end-for-end orientation of the spring in a like manner. According to still further principles of this invention, the edges of one or both ends of the elastomeric body are formed with a concave groove adapted to form a seal when pressed against an opposed seat surface.

These and other features, objects and advantages of the present invention will become apparent from the detailed description and claims to follow, taken in conjunction with the accompanying drawing, in which like parts bear like reference numerals.

DESCRIPTION OF THE DRAWINGS

Figure 1:
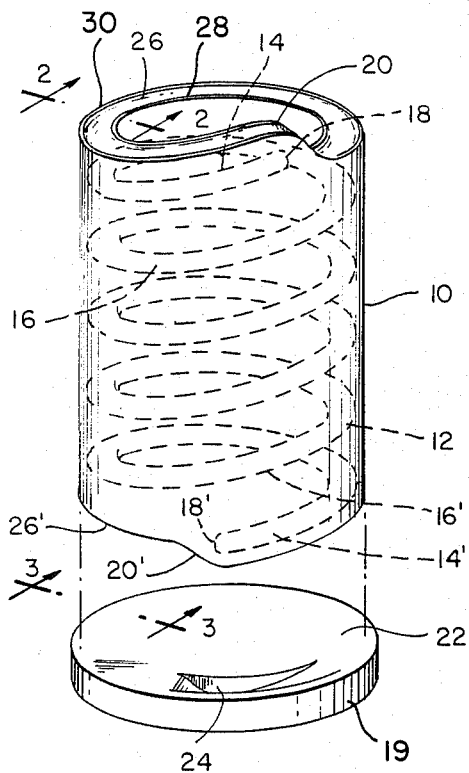
FIG. 1 is a perspective view of the composite spring of this invention, depicting the spring in its unloaded condition, together with a spring seat.

One presently preferred embodiment of the present invention, as illustrated in FIG. 1, is comprised of a tubular elastomeric body 10, and a coil spring 12, embedded in body 10. The coil spring is composed entirely of active coils. That is, each and every coil, including both of its end coils, is adapted to be deflected in response to axial compression of the composite spring. In the illustrated example, spring 12 has two end coils, each of which is made up of a partial turn having a uniform pitch with respect to the adjacent coil.

Referring to the upper end of spring 12, as illustrated in FIG. 1, this partial turn (designated by reference numeral 14) has a uniform pitch which respect to adjacent coil 16, and a terminus 18 which is spaced from coil 16. In the example, terminus 18 is blunt for reduced stress concentrations in the surrounding elastomer under deflection conditions. The opposite end of spring 12 is of corresponding construction and therefore is not described separately. Corresponding portions of that end are, however, designated by the same reference numerals, primed.

In the example illustrated, spring 12 is wound in a clockwise direction, and terminus 18 and terminus 18' are in substantial axial alignment. In some applications, however, it may be desirable to wind spring 12 in the opposite direction, or to offset terminus 18 from terminus 18', in order to control the deflection characteristics of the composite spring. Another reason for offsetting terminus 18 from terminus 18' is to provide for control of the spring orientation, as will be described presently. It will be recognized that one end coil of spring 12 may be of conventional flat wound construction, and that in such constructions this coil will constitute a "dead" coil.

Still referring to FIG. 1, body 10 includes two ends which, in the example illustrated, form shoulders 20 and 20'. These shoulders respectively encase terminus 18 and terminus 18'. Shoulders 20 and 20' also provide stable, resilient support for end turns 14 and 14', respectively, and therefore allow them to deflect conjointly with interior coils 16, 16' and the intervening coils not referenced. The end wall of body 10 may be thicker adjacent each terminus, accordingly tapering down to a uniform thickness in opposite directions about the circumference of the end wall.

Figure 4:
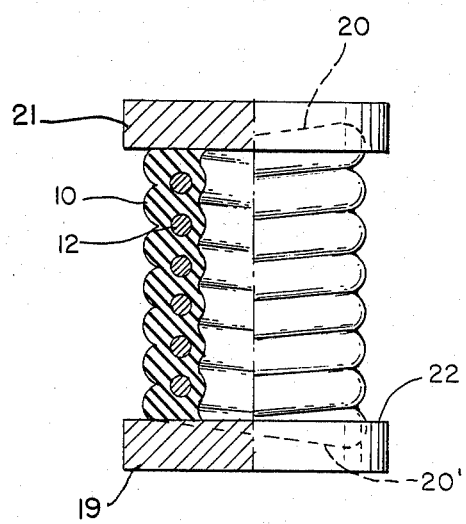
FIG. 4 is a side elevation, partially in longitudinal section, of the FIG. 1 spring, depicting the spring in its loaded condition.

Referring to FIG. 4, spring 12, being embedded in the cylindrical wall of body 10, restrains body 10 from bulging along a helical path that coincides with the individual coils of spring 12. Body 10 is free to bulge laterally, however, in the axial spaces between adjacent convolutions of this path (or between the individual coils of spring 12) at the intervals corresponding to the pitch of spring 12. Thus, when loaded, the composite spring appears as a rubber coil spring, in which each individual "coil" is formed by one of these lateral bulges. Shoulders 20 and 20' are included in, and form part of, the outermost coils of this rubber coil spring.

The composite spring of the present invention is adapted to be mounted between opposed, flat spring seats 19 and 21. As depicted in FIG. 1, seat 19 is made up of a flat load bearing surface 22 and a single recess 24 which, in the example, registers with shoulder 20'. Seat 21 is generally similar to seat 19, and therefore is not described separately. When the composite spring is mounted between seats 19 and 21, as shown (FIG. 4), the shoulders 20 and 20' are inserted into and register with recesses formed by seats 19 and 21, and the spring ends bear against the opposed planar surfaces of the spring seats.

The recesses formed by seats 19 and 21 may be so located with respect to the suspension strut or other load device with which the composite spring is used to provide selective orientation of the spring with respect to its deflection characteristics. Such orientation control may be accomplished with respect to the rotative or "clock" position of the spring simply by forming one or both seats with a single recess, such as that illustrated in FIG. 1. In this example, recess 24 is located at a predetermined position with respect to the predicted deflection of the spring. Since only a single recess is provided, the spring can be mounted only in that "clock" position which yields acceptable deflection. In addition, by offsetting the locations of shoulders 20 and 20', the end-for-end orientation of the spring may be controlled in a like manner so that the spring can be mounted in only a single end-for-end orientation. Consequently, it is possible to provide for a unique spring orientation. This enables the spring deflection characteristics to be matched predictably and reliably with the load devices with which it is used, and minimizes or eliminates the risk of improper spring installation.

Figure 2:
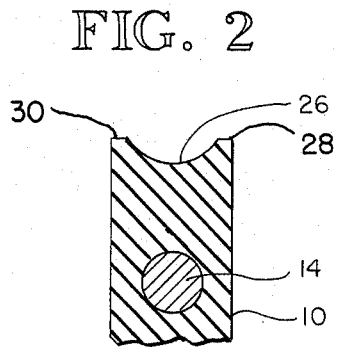
FIG. 2 is a section taken along the line 2—2 in FIG. 1.
Figure 3:
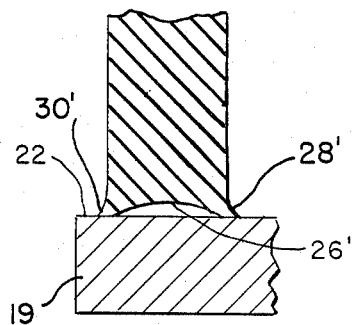
FIG. 3 is a section taken along the line 3—3 in FIG. 1, depicting one end of the FIG. 1 spring engaged with the FIG. 1 spring seat.

Referring now to FIGS. 1-3, the composite spring of the present invention provides for sealing the ends of the spring with respect to the spring seats between which it is compressed. In the example, the edges of both ends of the spring respectively include continuous grooves 26 and 26'. As depicted in FIG. 1 and 2, groove 26 has a semi-circular outline. It is of sufficient depth, and is of such width with respect to the wall thickness of body 10, that it forms parallel, inner and outer lips 28 and 30. These lips are separated by groove 26 and extend about the entire periphery of the upper end. Groove 26', together with lips 28' and 30', is of corresponding structure and is not described separately.

When pressed against a conforming spring seat, as depicted in FIG. 3, lips 28 and 30, or 20' and 30', as the case may be, spread apart, causing the intervening groove to collapse and form a suction-like seal about the entire periphery of one end. Each of these seals extends through and includes the recess, if any, formed by the spring seat. One or both ends of the composite spring thus may be sealed so as to prevent the entrance of moisture, as well as dirt or other contaminants into the interior of the spring. In addition, the seal obtained may be used to provide a pressure seal with respect to positive or negative fluid pressure within the composite spring. It will be recognized that this construction may be formed in the ends of other tubular elastomeric springs, with or without embedded coil springs, to obtain such seals.

Although one presently preferred embodiment of this invention has been illustrated and described herein, variations will become apparent to one of ordinary skill in the art. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. A composite spring, comprising: a tubular elastomeric body and a coil spring embedded in said body;
   said coil spring including two end coils, one of which is made up of a partial turn having a uniform pitch with respect to an adjacent coil, and a terminus spaced from said adjacent coil;
   said body including two ends, one of which forms a shoulder adjacent said terminus, said one end including a concave portion forming two parallel lips separated by a continuous groove extending about the entire periphery of said one end, said lips being sufficiently flexible that they spread apart, causing said groove to form a suction seal about the entire periphery of said one end, when said one end is pressed against a surface.

2. The spring of claim 1, wherein said terminus is blunt.

3. The spring of claim 1, wherein the other end coil of said coil spring is made up of a second partial turn having a uniform pitch with respect to a second adjcent coil, and a second terminus spaced from said second adjacent coil, and wherein the other end of said body forms a second shoulder adjacent said second terminus.

4. The spring of claim 3, wherein said second terminus is blunt.

5. The spring of claim 3, wherein said second end includes a concave portion forming two parallel lips separated by a second continuous groove extending about the entire periphery of said second end, said last-mentioned lips being sufficiently flexible that they spread apart, causing said second continuous groove to form a suction seal about the entire periphery of said second end, when said second end is pressed against a surface.

6. The spring of claim 3, wherein the locations of said first-mentioned shoulder and said second shoulder are selected to control the orientation of said composite spring.

7. In a tubular elastomeric spring having a wall and two ends, one of which includes a concave portion forming two parallel lips separated by a continuous groove extending about the entire periphery of said one end, and spaced apart a distance less than the thickness of said wall, said lips being sufficiently flexible that they spread apart, causing said groove to form a suction seal about the entire periphery of said one end, when said one end is pressed against a surface.

8. The spring of claim 7, wherein the other end includes a concave portion forming two parallel lips separated by a second continuous groove extending about the entire periphery of said other end, and paced apart a distance less than the thickness of said wall, said last mentioned lips being sufficiently flexible that they spread apart, causing said second continuous groove to form a suction seal about the entire periphery of said other end, when said other end is pressed against a surface.

9. A method for sealing a tubular elastomeric spring having a wall and two ends, comprising the steps of: forming one end with a concave portion having two parallel lips separated by a continuous groove extending about the entire periphery of said one end, and spaced apart a distance less than the thickness of said wall; and pressing said one end against a surface so that said lips spread apart, causing said groove to form a suction seal about the entire periphery of said one end.

10. The method of claim 9, comprising the additional steps of: forming the other end with a concave portion having two parallel lips separated by a second continuous groove extending about the entire periphery of said other end, and spaced apart a distance less than the thickness of said wall; and pressing said other end against a surface so that said last-mentioned lips spread apart, causing said second continous groove to form a suction seal about the entire periphery of said other end.

11. A composite spring, comprising: a tubular elastomeric body having two ends, one of which includes a shoulder so constructed and arranged that said spring may be engaged with a spring seat in only orientation of said composite spring, said one end including a concave portion forming two parallel lips seprated by a continous groove extending about the entire periphery of said one end, said lips being sufficiently flexible that they spread apart, causing said groove to form a suction seal about the entire periphery of said one end, when said one end is pressed against said spring seat.

12. The spring of claim 11, wherein the other end of said body includes a second shoulder so constructed and arranged that said spring may be engaged with a second spring seat in only one orientation of said composite spring, while simultaneously therewith said one end is engaged with the first-mentioned spring seat, whereby said composite spring is positionable between the first-mentioned spring seat and said second spring seat in only one end-for-end rotative orientation, and wherein said other end includes a concave portion forming two parallel lips separated by a second continuous groove extending about the entire periphery of said other end, said last-mentioned lips being sufficiently flexible that they spread apart, causing said second continuous groove to form a suction seal about the entire periphery of said other end, when said other end is pressed against said spring seat.

* * * * *